(12) United States Patent
Meyer et al.

(10) Patent No.: US 10,330,545 B2
(45) Date of Patent: Jun. 25, 2019

(54) TRANSDUCER SENSOR BODY

(71) Applicant: MTS Systems Corporation, Eden Prairie, MN (US)

(72) Inventors: Richard Alan Meyer, Chaska, MN (US); Glenn Arthur Lucachick, Bloomington, MN (US); Matthew David Slama, Maple Plain, MN (US); Robbin Scott Roberts, St. Michael, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 186 days.

(21) Appl. No.: 15/389,801

(22) Filed: Dec. 23, 2016

(65) Prior Publication Data

US 2017/0184467 A1    Jun. 29, 2017

Related U.S. Application Data

(60) Provisional application No. 62/387,378, filed on Dec. 23, 2015.

(51) Int. Cl.
| | |
|---|---|
| *G01L 1/22* | (2006.01) |
| *G01L 3/14* | (2006.01) |
| *G01L 5/00* | (2006.01) |
| *G01L 5/16* | (2006.01) |

(52) U.S. Cl.
CPC ............ *G01L 5/161* (2013.01); *G01L 5/16* (2013.01); *G01L 1/22* (2013.01); *G01L 3/14* (2013.01); *G01L 5/00* (2013.01)

(58) Field of Classification Search
CPC ... G01L 5/16; G01L 5/161; G01L 5/00; G01L 3/14; G01L 1/22

USPC .................................................... 73/862.041
See application file for complete search history.

(56) References Cited

U.S. PATENT DOCUMENTS

| 4,628,745 A | 12/1986 | Hatamura | |
|---|---|---|---|
| 4,640,138 A * | 2/1987 | Meyer .................... | G01L 5/226 73/862.044 |
| 4,712,431 A | 12/1987 | Hatamura | |
| 6,253,626 B1 * | 7/2001 | Shoberg ............... | G01L 1/2231 73/775 |

(Continued)

OTHER PUBLICATIONS

International Search Report and Written Opinion for International patent application No. PCTUS2016/068514, dated Mar. 9, 2017.

*Primary Examiner* — Jonathan M Dunlap
(74) *Attorney, Agent, or Firm* — Steven M. Koehler; Westman, Champlin & Koehler, P.A.

(57) ABSTRACT

A transducer sensor body includes a first support structure and a second support structure. A tubular element has a center bore along a longitudinal axis. An elongated first flexure joins the tubular element to the first support structure parallel to the longitudinal axis. The first flexure is rigid to transfer a longitudinal force therethrough along the longitudinal axis and is rigid to transfer an axial force therethrough along an axial axis that is orthogonal to the longitudinal axis. An elongated second flexure joins the tubular element to the second support structure parallel to the longitudinal axis. The second flexure is rigid to transfer a longitudinal force therethrough along the longitudinal axis and is to transfer the axial force therethrough along the axial axis.

24 Claims, 5 Drawing Sheets

(56) References Cited

U.S. PATENT DOCUMENTS

| | | | |
|---|---|---|---|
| 7,743,672 B2 * | 6/2010 | Kurtz | G01L 3/1457 73/862.041 |
| 2004/0045372 A1 | 3/2004 | Liu | |
| 2008/0034894 A1 | 2/2008 | Meyer | |
| 2013/0291653 A1 | 11/2013 | Kempainen | |
| 2015/0135856 A1 | 5/2015 | Kim | |

* cited by examiner

TRANSDUCER SENSOR BODY

CROSS-REFERENCE TO RELATED APPLICATION

The present application is based on and claims the benefit of U.S. provisional patent application Ser. No. 62/387,378, filed Dec. 23, 2015, the content of which is hereby incorporated by reference in its entirety.

BACKGROUND

The discussion below is merely provided for general background information and is not intended to be used as an aid in determining the scope of the claimed subject matter.

Numerous forms of transducer sensor bodies have been advanced to measure forces and/or moments applied between two load bearing members. However, depending upon the application or the forces and/or moments to be measured, improved transducer sensor bodies are continuously needed.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One general aspect includes a transducer sensor body having a first support structure, a second support structure and a tubular element having a center bore along a longitudinal axis. The transducer sensor body also includes a first flexure being elongated and joining the tubular element to the first support structure parallel to the longitudinal axis, the first flexure being rigid to transfer a longitudinal force therethrough along the longitudinal axis and being rigid to transfer an axial force therethrough along an axial axis that is orthogonal to the longitudinal axis. The transducer sensor body also includes a second flexure being elongated and joining the tubular element to the second support structure parallel to the longitudinal axis, the second flexure being rigid to transfer a longitudinal force therethrough along the longitudinal axis and being rigid to transfer the axial force therethrough along the axial axis.

Implementations may include one or more of the following features. The first and second flexures can be compliant to a translational force along a translational axis that is mutually orthogonal to the axial axis and the longitudinal axis. The second flexure can be disposed on a side of the tubular element opposite the first flexure, and in a further implementation the first flexure and the second flexures can be mirror images of each other with respect to the longitudinal axis.

A second tubular element can be provided spaced apart from the tubular element and having a second center bore along a second longitudinal axis. A third flexure is elongated and joins the second tubular element to the first support structure parallel to the second longitudinal axis. The third flexure is rigid to transfer a longitudinal force therethrough along the longitudinal axis and is also rigid to transfer the axial force therethrough along the axial axis. Similarly, a fourth flexure is elongated and joins the second tubular element to the second support structure parallel to the second longitudinal axis. The second flexure is rigid to transfer a longitudinal force therethrough along the longitudinal axis and also rigid to transfer the axial force therethrough along the axial axis. The longitudinal axis and the second longitudinal axis can be aligned with each other along a common longitudinal axis. If desired, the first, second, third and fourth flexures can be compliant to a translational force along a translational axis that is mutually orthogonal to the axial axis and the longitudinal axis, or be rigid to transfer such a force allowing one of more of the flexures to have sensors. The tubular element and the second tubular element can be of the same diameter and thickness, or be different in one or both respects.

The transducer sensor body and the second tubular element can be of a shape and disposed relative to each other such that a space between them appears to be an aperture provided in a single tubular element. If desired, the second tubular element, third flexure and fourth flexure can be mirror images of the tubular element, first flexure and second flexure, respectively with respect to a plane having a center axis of the aperture and perpendicular to the common longitudinal axis.

A plurality of sensors configured to provide an indication of stress in the tubular element and the second tubular element such as but not limited to strain sensors can be disposed on the tubular elements. The plurality of sensors can be configured as single or separate Wheatstone bridges.

In another implementation a second transducer sensor body can be provided, which can comprise another single tubular element, or can comprise two tubular elements where a third tubular element, a fifth flexure, a sixth flexure, a fourth tubular element, a seventh flexure, an eighth flexure and a second common longitudinal axis are connected and arranged together in the same manner as the tubular element, the first flexure, the second flexure, the second tubular element, the third flexure, the fourth flexure and the common longitudinal axis are connected together, respectively. The common longitudinal axis of the transducer sensor body can be spaced apart from and parallel to the second common longitudinal axis of the second transducer sensor body, or spaced apart from and perpendicular to the second common longitudinal axis of the second transducer sensor body, or spaced apart from and oblique to the second common longitudinal axis of the second transducer sensor body, such as may be the case if three or more transducer sensor bodies are present and disposed about a common reference axis.

DETAILED DESCRIPTION OF ILLUSTRATIVE EMBODIMENTS

Figure 1:
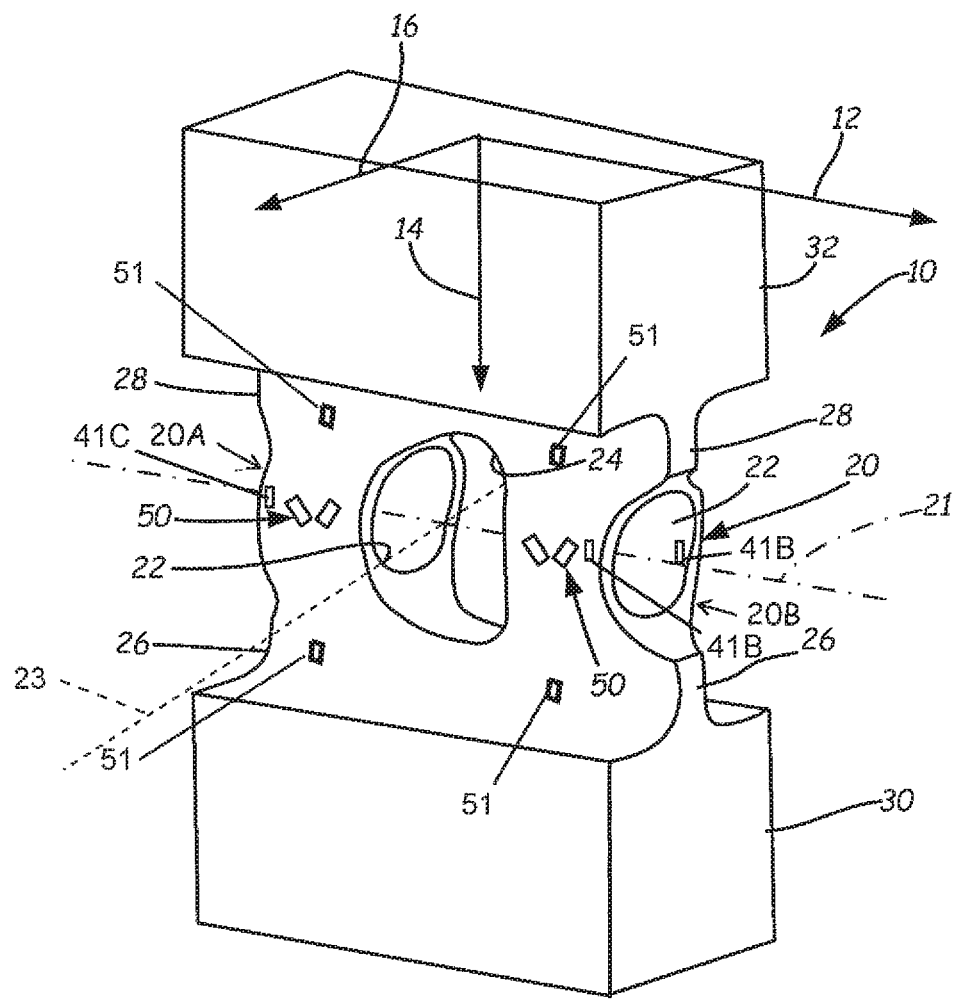
FIG. 1 is a perspective view of a transducer sensor body.

FIGS. 1-5 illustrate a transducer sensor body 10 that is capable of measuring with respect to an orthogonal coordinate system, force along two perpendicular axes and/or, a moment relative to a third axis mutually perpendicular to said two axes. In particular, the transducer body 10 is sensitive to a longitudinal force indicated at 12 and an axial force indicated at 14. The transducer sensor body 10 is compliant for translational forces along an axis 16 that is orthogonal to the longitudinal axis 12 and the axial axis 14. However, if desired, the transducer sensor body 10 can be used to sense a moment about axis 16.

Generally, the transducer sensor body 10 is a beam 20 having a bore 22 extending length-wise through the beam 20 along an axis 21 parallel to the longitudinal axis 12. A transverse aperture or hole 24 can be formed in the center of the beam 20 and is oriented in a direction parallel to the translational axis 16. The aperture 24 in beam 20 in effect forms two tubular beam elements 20A and 20B that are aligned with each other along the common axis 21. In one embodiment, aperture 24 includes a center axis 23 and the tubular element 20B and its flexures 26 and 28 are mirror images of the tubular element 20A, and its flexures 26 and 28, respectively with respect to a plane having the center axis 23 and perpendicular to the longitudinal axis 21.

Longitudinally oriented (preferably parallel to axis 21) flexures 26 and 28 join each tubular beam element 20A, 20B to load bearing members 30 and 32, respectively. Each of the flexures 26 and 28 are preferably formed integral from a single unitary body with the material of the beam 20 on opposite sides of each of the tubular beam elements 20A, 20B. The flexures 26 and 28 have a very small area moment of inertia with respect to the compliant direction indicated by axis 16. In one embodiment, the flexures 26 and the flexures 28 are mirror images of each other with respect to the longitudinal axis 21, or a plane including axis 21 and perpendicular to axis 14. The compact design of the transducer sensor body 10 enables the transducer sensor body 10 to be integrated into designs with tight space requirements while still maintaining sufficient sensitivities. Any number of transducer sensor bodies 10 can be integrated into a structure. For instance, three or more of the transducer sensor bodies 10 will allow measurement of forces and moments in all degrees of freedom. However, in other designs depending upon the forces or moments to be measured, two or more transducer sensor bodies 10 can be used.

Figure 2:
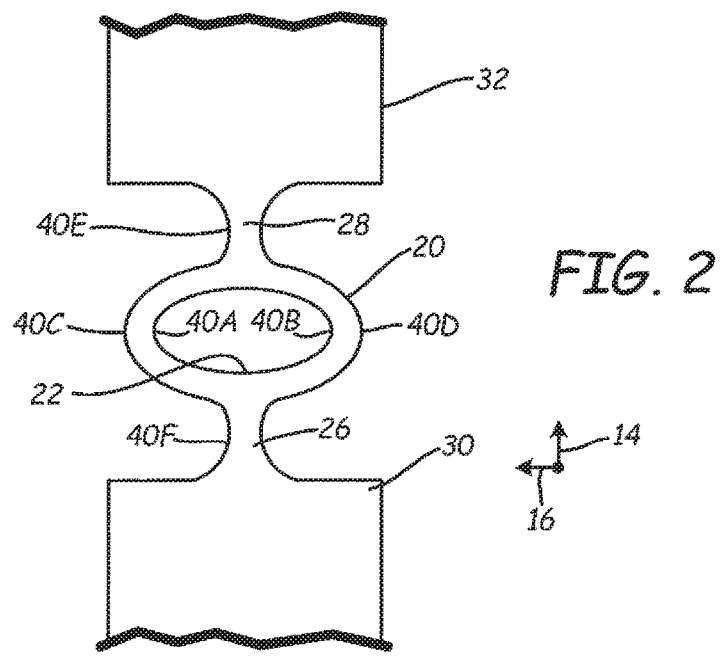
FIG. 2 is a schematic view of a first force applied to the transducer sensor body.
Figure 3:
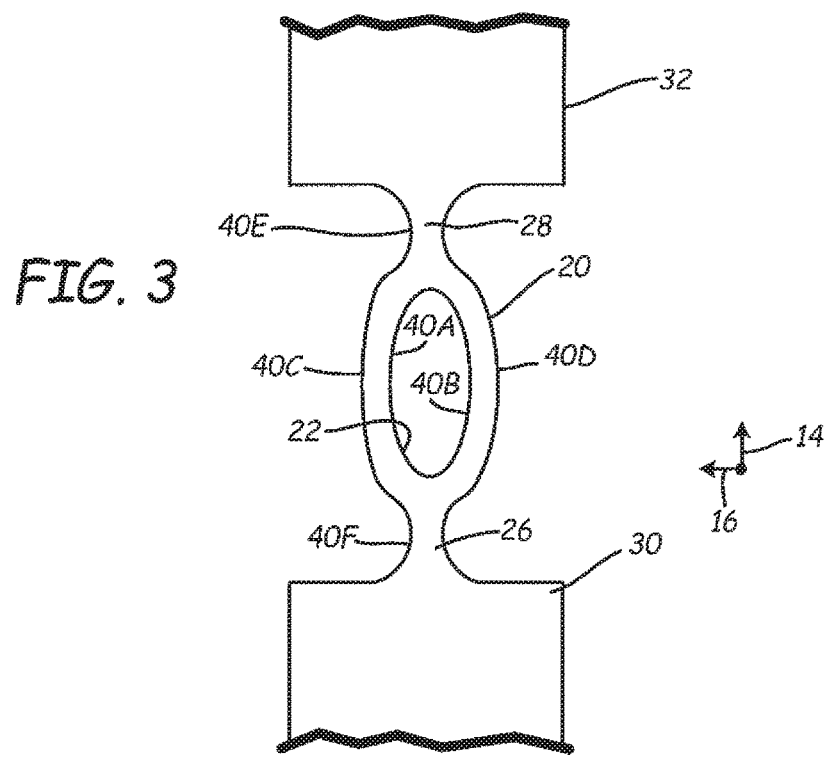
FIG. 3 is a schematic view of a second force applied to the transducer sensor body.

Referring to FIGS. 2 and 3, when the transducer sensor body 10 is stressed in the vertical (axial) direction 14, each tubular beam element 20A, 20B comprising a tube collapses as illustrated in FIG. 2 or elongates as illustrated in FIG. 3 in such a manner that the inside and outside surfaces are strained with opposite sign. Inner strain gauges (one of which is illustrated in FIG. 1 at 41B) can be located on inner surfaces of each of the tubular beam elements 20A, 20B as indicated at 40A and 40B, while outer strain gauges (two of which is indicated at 41C in FIG. 1) can also be mounted on outer surfaces indicated at 40C and 40D. The strain gauges mounted on these inner and outer surfaces can be wired in a conventional Wheatstone bridge 55 where the surfaces 40A-40D are used to indicate the strain gauges in the bridge 55 to provide an indication of force in the axial direction 14. The transducer sensor body 10 can have two Wheatstone bridge 55 circuits, one for each of the tubular beam elements 20A, 20B, or be connected so as to form a single Wheatstone bridge. Each bridge is a full Wheatstone bridge with increasing and decreasing legs. This allows each of the bridges to yield a larger output than traditional methods, where for example Poisson gauges are used in two legs of the bridge. In addition, the maximum principle stress due to shear is measured by finding the maximum principle axial strain (45 degrees) on the diagonal when a shear load is present between load bearing members 30 and 32. It should be noted that shear gauges on each of the tubular beam elements 20A, 20B can be wired in a Wheatstone bridge such that the bending moment strain is cancelled out. Although discussed above with strain gauge sensor elements (such as resistive gauges), the transducer sensor body 10 is not limited to the use of such sensor elements in that other forms of sensor elements such as but not limited to capacitive, optical or the like can also be used.

Figure 5:
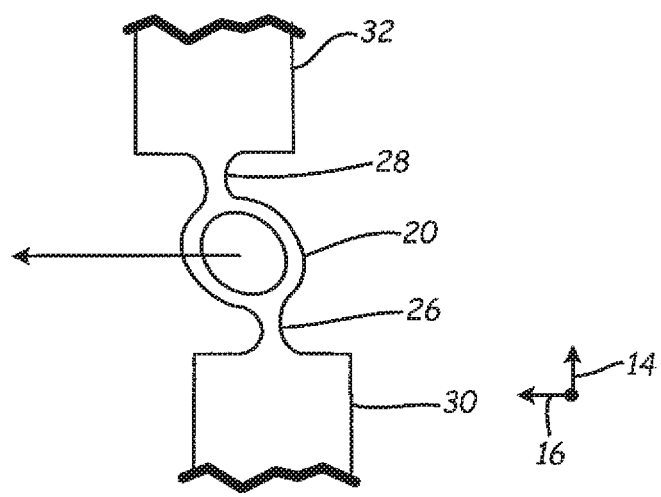
FIG. 5 is a schematic view of a fourth force applied to the transducer sensor body.
Figure 6:
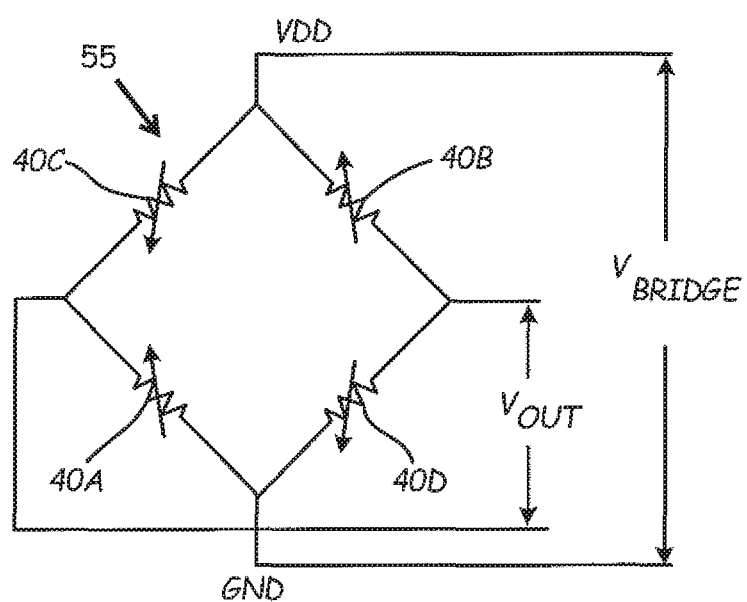
FIG. 6 is a schematic diagram of a Wheatstone Bridge.

In addition, the strain gauges such as described above, or other forms of sensors, can be placed on one or both ends of the beam (on one or both sides at 40E and/or 40F of the flexures 26 and/or 28 in FIG. 1) of the beam 20, for example, midway along its length such that minimal strain will be induced into the gauges when the beam is loaded in the compliant direction as in FIG. 5. Placement of the sensors at the point(s) 40E and/or 40F can be used to mitigate strain due to double-cantilever bending from loads in the compliant direction (temperature expansion growth).

Figure 4:
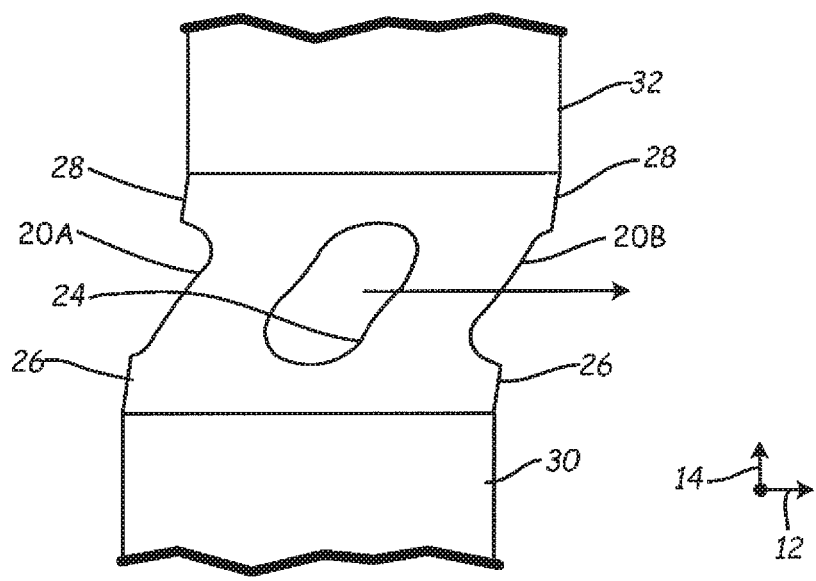
FIG. 4 is a schematic view of a third force applied to the transducer sensor body.

FIG. 4 illustrates deformation of the transducer sensor body 10 when a longitudinal force along axis 12 is applied. FIG. 1 illustrates exemplary shear gauges 50 on the outside of the beam 20 to provide an indication of a longitudinal force. Commonly, each of the tubular beam elements 20A, 20B include a set of shear gauges 50 on the outside surface on each side of the tubular beam elements 20A, 20B that can be connected in a Wheatstone bridge (similar to bridge 55) for each tubular beam element 20A, 20B or connected so as to form a single Wheatstone bridge.

Referring to FIG. 5, when a side load is applied between load bearing members 30 and 32, the flexures 26 and 28 allow the beam 20 or each tubular beam element 20A, 20B to deflect. In one embodiment, the flexures 26 and 28 are sufficiently compliant so as not to substantially inhibit such a load. In another embodiment, typically when side loading can be significant, the flexures 26 and 28 can be provided with sensors such as axial strain gauges 51 for each tubular beam element 20A, 20B (illustrated one side although strain gauges would be provided on both sides). The strain gauges 51 can be connected in a Wheatstone bridge (similar to bridge 55) associated with each tubular beam element 20A, 20B or connected so as to form a single Wheatstone bridge.

The transducer sensor body 10 herein described is able to achieve much higher sensitivities than transducers with flat beams that use Poisson gauges in two legs of the Wheatstone bridge. Typically, the beam design herein offers 25% higher real world bridge output for the same stress as well as allows for lower fatigue stress or better sensitivities/resolution or both. Utilization of optimal structural design techniques and sculpting of the strain field provide for maximum beam strains that do not combine where they are not needed to and yet combine with maximum effectiveness under the axial strain gauge bridge. This effectively reduces temperature drift as the strains induced by temperature changes are a lower percentage of the measured strains. This higher sensitively also allows for less cross talk interaction between measured axes as well as providing for much enhanced resolution and improved signal noise range ratio which allows recognition of smaller changes in applied load and better rejection of EMI and EMF noise such as that which occurs in the ignition system of a passenger automobile or other vehicles. It should also be noted that the large area moment of inertia of the beam 20 and carrying loads that bend the compliant flexures 26 and 28 will reduce strain near the counter flexure point, reducing strain gauge output from temperature induced strains.

Advantageous features of the transducer sensor body 10 include a compact beam with very low overall length and overall design, size and weight. Stiffness is also optimized with a transducer incorporating one or more of the beams 20. A particular advantageous feature of the transducer sensor body 10 design is the ability to measure and carry loads with the same effectivity of traditional shear beams, while greatly increasing output while in the non-shear direction. The design allows for effective strain sculpting utilizing stress concentration of bored holes, which is advantageous. In a preferred embodiment, the beam 20, flexures 26 and 28, and load bearing members 30 and 32 are integral being formed from a single unitary body. The beam design however allows for easy construction by subtractive machining methods. The design is symmetrical and yields a symmetrical output, although in other embodiments where it could be advantageous that they are dissimilar. The design is inherently linear where Axial and Poisson designs are inherently non-linear. The beam design allows for a 25% higher output in forces in the axial direction with the same fatigue stress as compared to a slab-sided beam of the same length. The beam design can be configured with other beams having the same or similar construction so as to yield a load cell of larger transducer structure having two or more beams.

Figure 7:
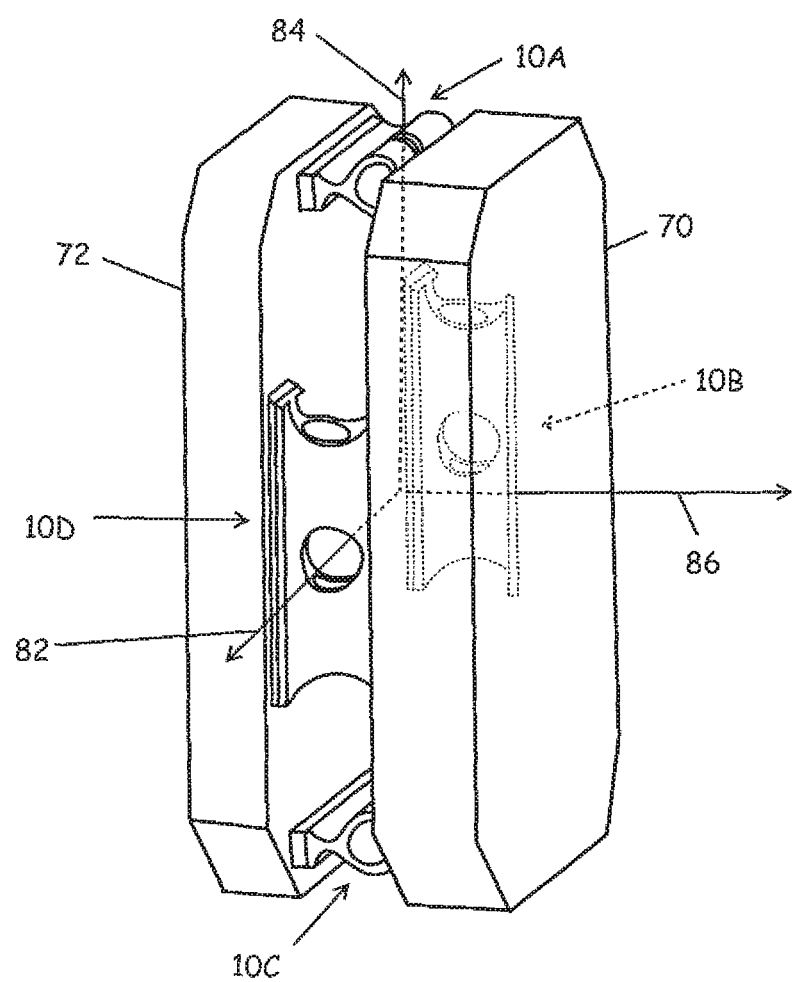
FIG. 7 is a first embodiment of a plurality of transducer sensor bodies connecting a first load bearing member to a second load bearing member.

FIG. 7 illustrates an exemplary embodiment where four transducer bodies 10A-10D connect load bearing members 70 and 72. With respect to a coordinate system comprising mutually orthogonal axes 82, 84 and 86, transducer sensor bodies 10A and 10C are sensitive to a force along axis 82, while transducer sensor bodies 10B and 10D are insensitive due to the flexures thereof. Similarly, transducer sensor bodies 10B and 10D are sensitive to force along 84, while transducer sensor bodies 10A and 10C are insensitive due to the flexures thereof. Each of the transducer sensor bodies 10A-10D are sensitive to a force along axis 86. Since transducer sensor bodies 10A, 10C are oriented so as to be orthogonal to sensor bodies 10B, 10D, cross-talk is minimized. Moments with respect to axes 82, 84 and 86 can be obtained similarly. A moment about axis 82 can be computed from signals obtained by sensors present on transducer sensor bodies 10A and 10C from the stress causing compression and elongation of the tubular sensor bodies as illustrated in FIGS. 2 and 3. Likewise a moment about axis 84 can be computed from signals obtained by sensors present on transducer sensor bodies 10B and 10D. The moment about axis 86, that can be sensed with the sum of the longitudinal forces causing elongation of the tubular sensor bodies 10A-10D as illustrated in FIG. 4.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A transducer sensor body comprising:
   a first support structure;
   a second support structure;
   a tubular element having a center bore along a longitudinal axis; the tubular element having a tubular surface;
   a first flexure being elongated and joining the tubular element to the first support structure parallel to the longitudinal axis, the first flexure being rigid to transfer a longitudinal force therethrough along the longitudinal axis and being rigid to transfer an axial force therethrough along an axial axis that is orthogonal to the longitudinal axis;
   a second flexure being elongated and joining the tubular element to the second support structure parallel to the longitudinal axis, the second flexure being rigid to transfer a longitudinal force therethrough along the longitudinal axis and being rigid to transfer the axial force therethrough along the axial axis; and
   a plurality of sensors mounted directly to the tubular surface.

2. The transducer sensor body of claim 1 wherein the first and second flexures are compliant to a translational force along a translational axis that is mutually orthogonal to the axial axis and the longitudinal axis.

3. The transducer sensor body of claim 2 wherein the second flexure is disposed on a side of the tubular element opposite the first flexure.

4. The transducer sensor body of claim 3 wherein the first flexure and the second flexure are mirror images of each other with respect to the longitudinal axis.

5. The transducer sensor body of claim 1 wherein the tubular surface faces outwardly and the plurality of sensors are configured to provide a signal indicative of the longitudinal force.

6. The transducer sensor body of claim 1 wherein the tubular surface faces outwardly and the tubular element includes a second tubular surface that faces inwardly, and wherein the plurality of sensors are mounted directly to the tubular surface and the second tubular surface and configured to provide a signal indicative of the axial force.

7. A transducer sensor body comprising:
   a first support structure;
   a second support structure;
   a tubular element having a center bore along a longitudinal axis;
   a first flexure being elongated and joining the tubular element to the first support structure parallel to the longitudinal axis, the first flexure being rigid to transfer a longitudinal force therethrough along the longitudinal axis and being rigid to transfer an axial force therethrough along an axial axis that is orthogonal to the longitudinal axis;
   a second flexure being elongated and joining the tubular element to the second support structure parallel to the longitudinal axis, the second flexure being rigid to transfer a longitudinal force therethrough along the longitudinal axis and being rigid to transfer the axial force therethrough along the axial axis
   a second tubular element spaced apart from the tubular element having a second center bore along a second longitudinal axis;
   a third flexure being elongated and joining the second tubular element to the first support structure parallel to the second longitudinal axis, the third flexure being rigid to transfer a longitudinal force therethrough along the longitudinal axis and being rigid to transfer the axial force therethrough along the axial axis; and
   a fourth flexure being elongated and joining the second tubular element to the second support structure parallel to the second longitudinal axis, the fourth flexure being rigid to transfer a longitudinal force therethrough along the longitudinal axis and being rigid to transfer the axial force therethrough along the axial axis.

8. The transducer sensor body of claim 7 wherein the longitudinal axis and the second longitudinal axis are aligned with each other along a common longitudinal axis.

9. The transducer sensor body of claim 8 wherein the first, second, third and fourth flexures are compliant to a translational force along a translational axis that is mutually orthogonal to the axial axis and the longitudinal axis.

10. The transducer sensor body of claim 8 wherein the tubular element and the second tubular element are of shape and disposed relative to each other such that a space between them appears to be an aperture provided in a single tubular element.

11. The transducer sensor body of claim 10 wherein the aperture includes a center axis and the second tubular element, third flexure and fourth flexure are mirror images of the tubular element, first flexure and second flexure, respectively with respect to a plane having the center axis and perpendicular to the common longitudinal axis.

12. The transducer sensor body of claim 11 further comprising a plurality of sensors configured to provide an indication of stress in the tubular element.

13. The transducer sensor body of claim 12 wherein the plurality of sensors comprise strain sensors disposed on the tubular element.

14. The transducer sensor body of claim 13 wherein the plurality of sensors is configured in a Wheatstone bridge.

15. The transducer sensor body of claim 14 further comprising a second plurality of sensors configured to provide an indication of stress in the second tubular element.

16. The transducer sensor body of claim 15 wherein the second plurality of sensors comprise strain sensors disposed on the second tubular element.

17. The transducer sensor body of claim 16 wherein the second plurality of sensors is configured in a second Wheatstone bridge.

18. The transducer sensor body of claim 8 further comprising a second transducer sensor body comprising:
a third tubular element, a fifth flexure, a sixth flexure, a fourth tubular element, a seventh flexure, an eighth flexure and a second common longitudinal axis being connected together in the same manner as the tubular element, the first flexure, the second flexure, the second tubular element, the third flexure, the fourth flexure and the common longitudinal axis are connected together, respectively.

19. The transducer sensor body of claim 18 wherein the common longitudinal axis of the transducer sensor body is spaced apart from and parallel to the second common longitudinal axis of the second transducer sensor body.

20. The transducer sensor body of claim 18 wherein the common longitudinal axis of the transducer sensor body is spaced apart from and perpendicular to the second common longitudinal axis of the second transducer sensor body.

21. The transducer sensor body of claim 20 further comprising:
a third transducer sensor body having components connected in a manner identical to the transducer sensor body and arranged so as to be parallel to the transducer sensor body; and
a fourth transducer sensor body having components connected in a manner identical to the second transducer sensor body and arranged so as to be parallel to the second transducer sensor body.

22. The transducer sensor body of claim 7 wherein the third flexure is disposed on a side of the tubular element opposite the fourth flexure.

23. The transducer sensor body of claim 22 wherein the third flexure and the fourth flexure are mirror images of each other with respect to the second longitudinal axis.

24. The transducer sensor body of claim 7 wherein the tubular element and the second tubular element are of the same diameter and thickness.

* * * * *